United States Patent
Huang et al.

(10) Patent No.: US 6,277,168 B1
(45) Date of Patent: Aug. 21, 2001

(54) METHOD FOR DIRECT METAL MAKING BY MICROWAVE ENERGY

(76) Inventors: Xiaodi Huang, 406 Second St., Houghton, MI (US) 49931; Jiann-Yang Hwang, Rte. 1, Box 137B, Chassell, MI (US) 49916

( * ) Notice: Subject to any disclaimer, the term of this patent is extended or adjusted under 35 U.S.C. 154(b) by 0 days.

(21) Appl. No.: 09/502,518

(22) Filed: Feb. 14, 2000

(51) Int. Cl.⁷ .............................. C22B 1/14; C22B 9/022
(52) U.S. Cl. .................. 75/10.13; 75/10.14; 75/10.62; 75/770
(58) Field of Search ................... 75/10.13, 770, 75/10.14, 10.62

(56) References Cited

U.S. PATENT DOCUMENTS

| | | |
|---|---|---|
| 3,942,260 | 3/1976 | Nishitani . |
| 3,953,196 | * 4/1976 | Obenchain ..................... 75/10.15 |
| 4,147,911 | 4/1979 | Nishitani . |
| 4,321,089 | 3/1982 | Kruesi et al. . |
| 4,324,582 | 4/1982 | Kruesi et al. . |
| 5,131,941 | 7/1992 | Lemelson . |
| 5,280,149 | 1/1994 | Schneider et al. . |
| 5,393,320 | 2/1995 | Gomez . |

FOREIGN PATENT DOCUMENTS

WO-8904379-A1 * 5/1989 (WO) ............................. 75/10.13

OTHER PUBLICATIONS

Derwent ACC No. 1988–114056 for JP 63–060239–A published Mar. 1988 by Nippon Kokan KK.*

N. Standish and H. Worner, "Microwave Application in the Reduction of Metal Oxides with Carbon," Journal of Microwave Power and Electromagnetic Energy, vol. 25, No. 3, 1990, pp. 177–180 no month.

R. Irving, "Taking a Powder", *Mechanical Engineering*, Sep. 1999, pp. 55–59.

* cited by examiner

*Primary Examiner*—Roy King
*Assistant Examiner*—Tima McGuthry-Banks
(74) *Attorney, Agent, or Firm*—Dykema Gossett PLLC

(57) ABSTRACT

A method for the direct preparation of metal from metal containing ore by applying microwaves, alone or in combination with other heating means, to extract metal from masses made by forming a powder of ore and an optional reducing agent. The method minimizes the expenditure of energy used to refine the metal, the level of contamination introduced into the metal, and the production of environmental pollutants.

17 Claims, 5 Drawing Sheets

METHOD FOR DIRECT METAL MAKING BY MICROWAVE ENERGY

CROSS-REFERENCE TO RELATED APPLICATIONS

NOT APPLICABLE

STATEMENT REGARDING FEDERALLY SPONSORED RESEARCH OR DEVELOPMENT

NOT APPLICABLE

BACKGROUND OF THE INVENTION

1. Field of the Invention

The present invention relates to a direct metal making method that utilizes microwave energy to reduce and melt metal-containing material, and separate molten metals from slag.

2. Description of the Related Art

Current processes for the extraction of metals from their respective ores are characterised by high energy consumption and the release of environmentally undesirable by-products, including large quantities of fine particulate, $SO_2$, $CO_2$, and $NO_x$.

Historically, steel making has been practised using an indirect method whereby iron is first produced from ore or scrap metal and then converted into steel. In a typical iron smelting process, iron ore is ground to 500 mesh to liberate iron oxides from other minerals. The resultant material then goes through a separation process such as froth flotation to concentrate iron oxides. The resulting fine particles are normally pelletized with limestone and bentonite. Iron ore pelletizing and sintering are necessary to provide the required permeability for blast air and strength to support the heavy load in a blast furnace. The pellets, or masses, are sintered to make them strong, and charged, along with coke, into a furnace in which the pellets and coke are subjected to a blast of very hot air. In the furnace, the iron oxide is reduced and melted. During the melting, the iron picks up carbon and sulphur from the coke. To make steel, the carbon content of the iron must be reduced. This is commonly done in a basic oxygen furnace (BOF). Pure oxygen is blown, at supersonic velocity, into a molten mass, including liquid iron, contained in a bottle-shaped furnace. The oxygen reacts with the carbon in the molten iron to form CO and $CO_2$. Sulphur, which is harmful to most steels, is removed by injecting a powdered material into the molten steel to form sulfides. The sulfides are collected as slag from the top of the molten mass.

This production route is very energy and material inefficient and causes serious environmental problems. The whole process is very dusty and noisy, and consequently poses health and environmental problems for workers and others in the area. Coke must be used to generate a temperature high enough for melting iron. Adding coke to the mixture, however, introduces carbon and sulphur into the iron. These elements must then be removed in subsequent processing. Also, the production of coke is an environmentally unfriendly process, and recently a shortage of coke has been a serious problem.

The production of other metals such as copper, nickel, lead, zinc and ferro-alloys present similar problems. $SO_2$ emission is an additional problem for ores containing sulphur.

Various methods have been used to supply the heat necessary to melt metal and the material in which it is borne so that they may be separated. These include the burning of fossil fuels such as coal, coke, and oil, and the use of electric heaters.

Electric induction heating has been particularly useful because it introduces no additional contaminants into the metal being melted and produces no local emissions. One drawback of induction heating, however, is that it relies on the conduction of eddy currents within the material being heated. Induction heating is impossible if the material is not an electric conductor such as a metallic ore. Typically induction heating is only used where scrap metal is available in the initial charge to the furnace.

Electric arc heating is a popular method to produce metals from scraps. As with induction heating, the material to be heated must be an electric conductor. Metallic ores can't be heated directly by electric arc.

Microwave heating, as disclosed herewithin, transmits energy to electrically nonconductive materials or small agglomerations of metallic material more efficiently than induction heating or electric arc heating. It thus provides an alternative to the burning of fossil fuel, and can do the initial heating that makes later use of induction heating or electric arc heating feasible.

Various processes have been developed utilizing microwave energy in the purification of metallic compounds. U.S. Pat. No. 4,321,089 discloses a process for the recovery of molybdenum and rhenium from their sulfide ores. In the disclosed process, the sulfide ores are subjected to microwave energy in the presence of oxygen or chlorine to form oxides or chlorides respectively. In neither case is the metal reduced. These oxide or chloride intermediates are then subjected to additional processing under reducing conditions to produce metal. Both of these processes differ from the direct reduction processing disclosed herewithin, inasmuch as the microwave processing results only in an oxidized intermediate.

U.S. Pat. No. 4,324,582 (the '582 patent), also to Kruesi et al., discloses a process applying microwave energy to convert copper compounds into other compounds, such as oxides and chlorides, from which copper is more readily recoverable. The claims of the '582 patent are restricted in scope to using microwave energy "to convert the sulfidic and oxidic compounds in the ores to compounds from which copper is more readily recoverable".

The specification of the '582 patent specifically teaches away from ferrous metal processing as disclosed herein, asserting that "the oxides of iron and chromium, which are transition metals, do not absorb microwaves," and "the gangue of the ore does not appreciably absorb microwave radiation".

In contrast to the preparation of an intermediate material as disclosed above, the process of the present invention results directly in a purified metal by the chemical reduction of oxides, sulfides, and other ores and metal sources through the application of microwaves and appropriate reducing agents in combination with induction heating or electric arc heating.

U.S. Pat. No. 5,131,941 (the '941 patent) to Lemelson issued Jul. 21, 1992, discloses a process for refining metal from ore, including flowing a stream of small particles of ore to a reaction zone. The process disclosed in the '941 patent is very different from that of the instant disclosure. The '941 patent process is adapted to the processing of fine particles in a flowing stream without the benefit of reducing agents. It is fundamentally directed to beam energy processes, unlike the present invention which is directed to the processing of massed material in a microwave cavity.

It is clear that the above-mentioned examples from the prior art do not possess the novel attributes of the present invention, namely the clean direct production of metals and efficient use of materials for the metal industry. This invention presents a revolutionary method to produce metals directly from ores by utilizing microwave energy as the primary heating source. This process is dramatically different from any of the current metal making techniques. The foreseeable advantages of this new metal making method over the traditional metal making methods include reductions in energy consumption and combustion emissions, the elimination, or reduction, of coke with its related environment problems, lower capital investment, and lower production cost, and minimal contamination of the metal produced.

BRIEF SUMMARY OF THE INVENTION

The invention includes a method for the direct preparation of metal from metal-containing material, such as metallic ore or scrap metal. To practice the invention one provides a metal-containing material and a reducing agent and mixes these either prior to or after introducing them into a container. The container should be of appropriate material to serve as, or use within, a microwave cavity. It should be able to tolerate high temperatures without substantial degradation. The container should be adaptable to the inclusion of induction or electric arc heating apparatus. Once the metal-containing ore and reducing agent have been charged into the container, microwaves are generated using a microwave source and applied to the contents of the container. It is preferable that the frequency of microwaves used selectively heats the metallic ores or metals of the metal-containing material. The application of microwaves to the metal-containing material continues until the metallic ores have been reduced to metal and the metal has absorbed enough energy to become molten. Meanwhile, additional induction or electric arc energy can be directed into the system to assist heating and allow time for the molten material to accumulate, under the action of gravity, at the bottom of the container.

BRIEF DESCRIPTION OF THE SEVERAL VIEWS OF THE DRAWINGS

The invention is further described with reference to the several views of the drawings wherein, without limiting the scope of the claimed invention:

DETAILED DESCRIPTION OF THE INVENTION

In the practice of the instant invention, ore is crushed, ground and concentrated by a separation process. The separation process can be a flotation, gravity, magnetic, electrostatic, or other physical separation processes as known to those of skill in the art. The concentrated fine particles of ore are mixed with a reducing agent, an internal combustion auxiliary fuel, and a fluxing agent, in a certain ratio. It is preferable that the reducing agent, the internal combustion auxiliary fuel and the fluxing agent are introduced as powdered solids, masses, or pellets. Gases or liquids may also be used, however. The preferred reducing agents include materials containing carbon, hydrogen, hydrocarbons, Al, Si, Mn, Mg, Ti, Cr, Na, Li, Ca, Y and Zr. The preferred internal combustion auxiliary fuels include coal, coke, carbon, wood, oil, and hydrocarbon wastes. The preferred fluxing agents include lime, limestone, $CaF_2$, and $Na_2O$. The preferred ratio is determined according to the composition of the concentrated ore, the reducing agent, the internal combustion auxiliary fuel, and the fluxing agent, as well as the desired percentage of energy provided by the internal combustion auxiliary fuel. Generally the reducing agent, internal combustion auxiliary fuel and fluxing agent comprise about 5 to about 40%, about 1 to about 20%, and about 1 to about 15% by weight respectively of the contents of the container.

By-products or metal-containing wastes such as smelter dust, roll scale and plating sludge also can be used as the metal-containing material. Consequently, the metals in these by-products or wastes can be partially or entirely recovered through the use of this invention. The by-products or wastes should preferably be powders or agglomerates of powders. Metal scraps and other recyclable metals also can be added into the concentrated ores, by-products, or wastes.

In some cases a metal-containing material may be incapable of efficiently absorbing microwave radiation of an available frequency. In such cases a microwave absorber material may be blended with the ore or metal-containing material to increase its microwave absorption. The microwave absorber material can be selected from the group of materials containing anthracite, argentite, arsenopyrite, bismuth, bornite, braunite, chalcocite, chalcopyrite, chrysotile, cobaltite, covellite, enargite, galena, graphite, hematite, ilmenite, magnetite, manganite, marcasite, molybdenite, proustite, pyrargyrite, pyrite, pyrolusite, pyrrhotite, smaltite, tetrahedrite, zincite, and hydrocarbon. The microwave absorber materials are used in powder form or in a solution of about 0.1 to about 20% concentration.

Figure 1A:
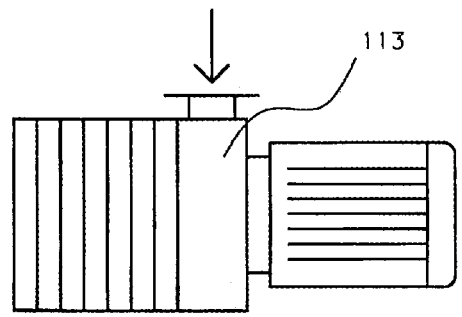
FIG. 1A shows a vacuum pump.
Figure 1B:
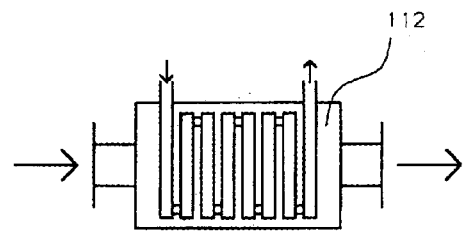
FIG. 1B shows a sulphur condenser.
Figure 1C:
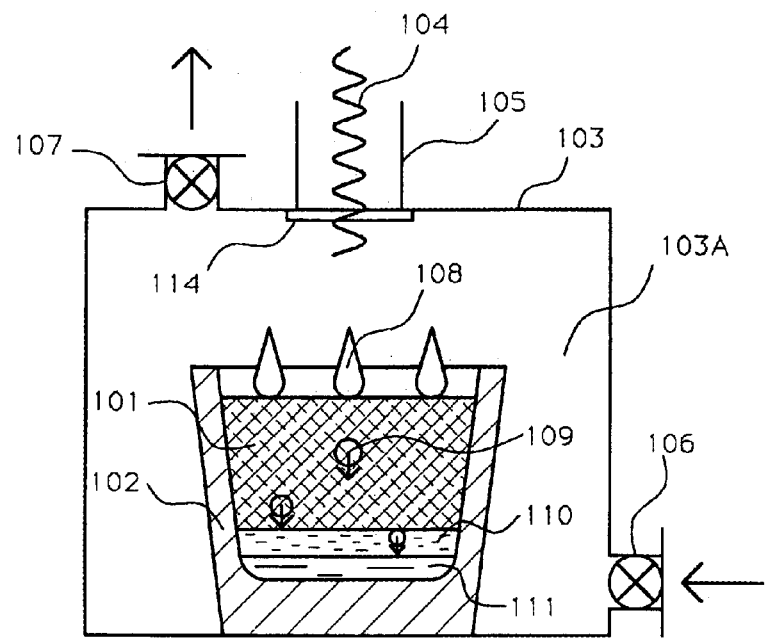
FIG. 1C shows a crucible within a microwave cavity including valved inlet, valved outlet and a waveguide.

As shown in FIG. 1C, after mixing, the raw material 101 is charged into a crucible 102. It is preferred to use a crucible made of a material which absorbs relatively less microwave energy than the mixed raw material does. The crucible also should have a softening temperature higher than the melting point of the mixed raw material. Appropriate crucible materials include fireclay, mullite, $SiO_2$, $Al_2O_3$, SiC, MgO, zircon, and chromite.

After charging, the crucible is moved into a special high power microwave furnace 103 with a single mode or multi-mode cavity 103A. Microwaves 104 are introduced into the cavity through a waveguide 105. The high power microwave furnace can deliver intensive microwave energy in a small space. For example, the microwave power can reach over 10 $W/cm^3$. The microwave frequency is 0.915 GHz, 2.45 GHz, or other frequency, or continuously adjustable. An inlet 106 and an outlet 107 with valves may be constructed on the microwave cavity to introduce gas and to release exhaust gas for controlling the atmosphere of the microwave cavity.

To produce a metal, microwave power is turned on and the mixed raw material starts to absorb microwave energy and increase in temperature. The ore reacts directly or indirectly with the reducing agent to become a metal. In the case of indirect reaction, the reducing agent reacts first with air to form a reducing gas. The ore subsequently reacts with the reducing gas to form a metal. Alternately, the ore decomposes first to form a compound and the compound thus formed reacts with the reducing agent to form a metal.

When the mixture within the crucible reaches an appropriate temperature, the internal combustion auxiliary fuel ignites to generate heat 108 and to further increase temperature. The ore starts to melt and form molten metal droplets 109 and a molten slag 110. Due to the specific density differences between the metal and the slag, the molten metal droplets descend by gravity and form a molten pool 111 at the bottom of the crucible and the slag 110 floats on the top of the molten metal. The fluxing agent melts and reacts with the slag to reduce the viscosity of the slag. The result is better separation of the molten metal and the molten slag.

After molten metal forms, the slag and the crucible material continue to absorb microwave energy and maintain an elevated temperature. After the separation of the molten metal and slag, the microwave generator is turned off, and the crucible is moved out of the microwave furnace and allowed to cool. This cooling results in the formation of a solid metal ingot. The solidified slag is broken from the ingot using a mechanical impact. Alternately, the slag may be stripped off while still molten after the crucible is moved out the microwave furnace. The molten metal can then be poured into molds to solidify and form ingots.

If the ore contains a great amount of sulphur such as $Cu_2S$, $Ni_2S_3$, PbS and ZnS, (Fe, Ni)$_9S_8$ a sulphur condenser as shown in FIG. 1B 112 or an $SO_2$ scrubber should be connected to the outlet 107 of the furnace to condense the sulphur vapor and capture $SO_2$ released from the mixture during heating.

Some ores are poor microwave absorbers at ambient temperature but absorb microwaves much more efficiently at higher temperatures. To process these materials, the mixture of ore, reducing agent and fluxing agent may be preheated in a conventional electrical, gas or oil furnace to a certain temperature and then transferred into the microwave furnace, where the reduction and melting process are continued under the influence of applied microwave energy.

The use of a gaseous reducing agent may be efficacious in some circumstances. In such a case a reducing gas may be continuously introduced into the cavity of the microwave furnace during microwave heating. The reducing gas reacts with the metal-containing material therein to good effect. CO, $H_2$, and hydrocarbon gases can be used as the reducing gas. If a reducing agent contains carbon, $CO_2$ forms, due to the ore reduction, and is emitted into the air. To prevent $CO_2$ emission, $H_2$ or a hydrogen based reducing agent, such as ammonia, is preferred.

Some ores can be reduced under vacuum at high temperature without a reducing agent. In such circumstances no reducing agent need be used and the general consequence is the elimination of unwanted $CO_2$ emissions. The ore and fluxing agent are blended together and pelletized. The pellets are charged into a crucible and placed into the cavity 103A, as shown in FIG. 1C. A vacuum pump, as shown in FIG. 1A 113, is connected with the outlet 107 and inlet 106 is closed. The pump evacuates the cavity 103A to less than about 200 $\mu$m mercury (0.2 torr). Microwave energy heats the pellets under vacuum and the pellets reduce and melt to form molten metal and slag. A quartz window 114 is installed to hermetically seal the waveguide 105 but permit passage of microwaves 104.

Figure 2:
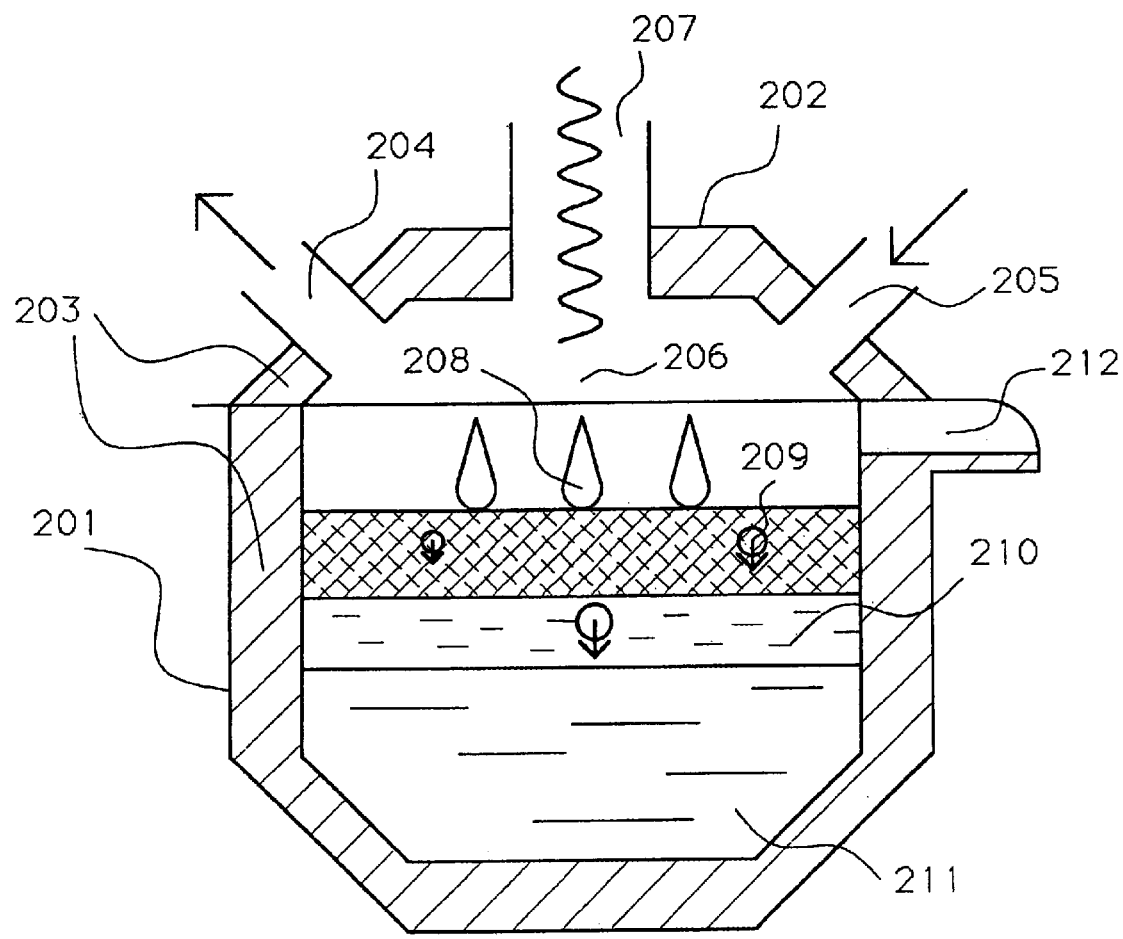
FIG. 2 shows a high powered microwave furnace.

In an alternative method, as shown in FIG. 2, a high power microwave furnace can be constructed with a water cooled metal vessel 201 and a removable water cooled metal cover 202. Both the vessel and the cover are lined with a refractory material 203. An inlet 205 and an outlet 204 may be included in the cover 202. Gases may be introduced through the inlet 205 and exhaust gases may be released via the outlet 204, thus controlling the atmosphere within the furnace. To produce a metal, the cover 202 is moved away and the mixed raw material containing ore and reducing agent is charged into the microwave cavity 206. The cover 202 is then moved back to close the vessel. Microwave radiation is introduced through the waveguide port 207 into the cavity 206. Thereafter the mixed raw material starts to absorb the microwave energy and increase in temperature. When the temperature is high enough, any auxiliary fuel introduced with the mixed raw material ignites to generate more heat 208 and further increase the temperature within the vessel. The ore starts to melt and form molten metal droplets 209 and a molten slag 210. Due to the specific density differences, the molten metal droplets descend to form a molten pool 211 at the bottom of the vessel and the slag 210 floats on the top of the molten metal. The fluxing agent melts and reacts with the slag to form a lower viscosity slag for better separation of the molten metal and the molten slag. The slag and the refractory material continue to absorb microwave energy and maintain an elevated temperature while metal and slag separate. After the separation of the molten metal and slag, the microwave generator is turned off, and the molten mass is allowed to cool. This cooling results in the formation of a solid metal ingot and slag. The solidified slag is broken from the ingot using a mechanical impact. Alternately, the molten slag may be stripped off after the microwave power is turned off. The cover 202 is moved away. The vessel is tilted to pour the molten slag through a discharging port 212 into a slag container. Subsequently the molten metal is poured into molds to form ingots, or into a caster to produce a continuous casting. The molten metal also can be poured into a ladle and transferred into another smelter for refining.

Figure 3:
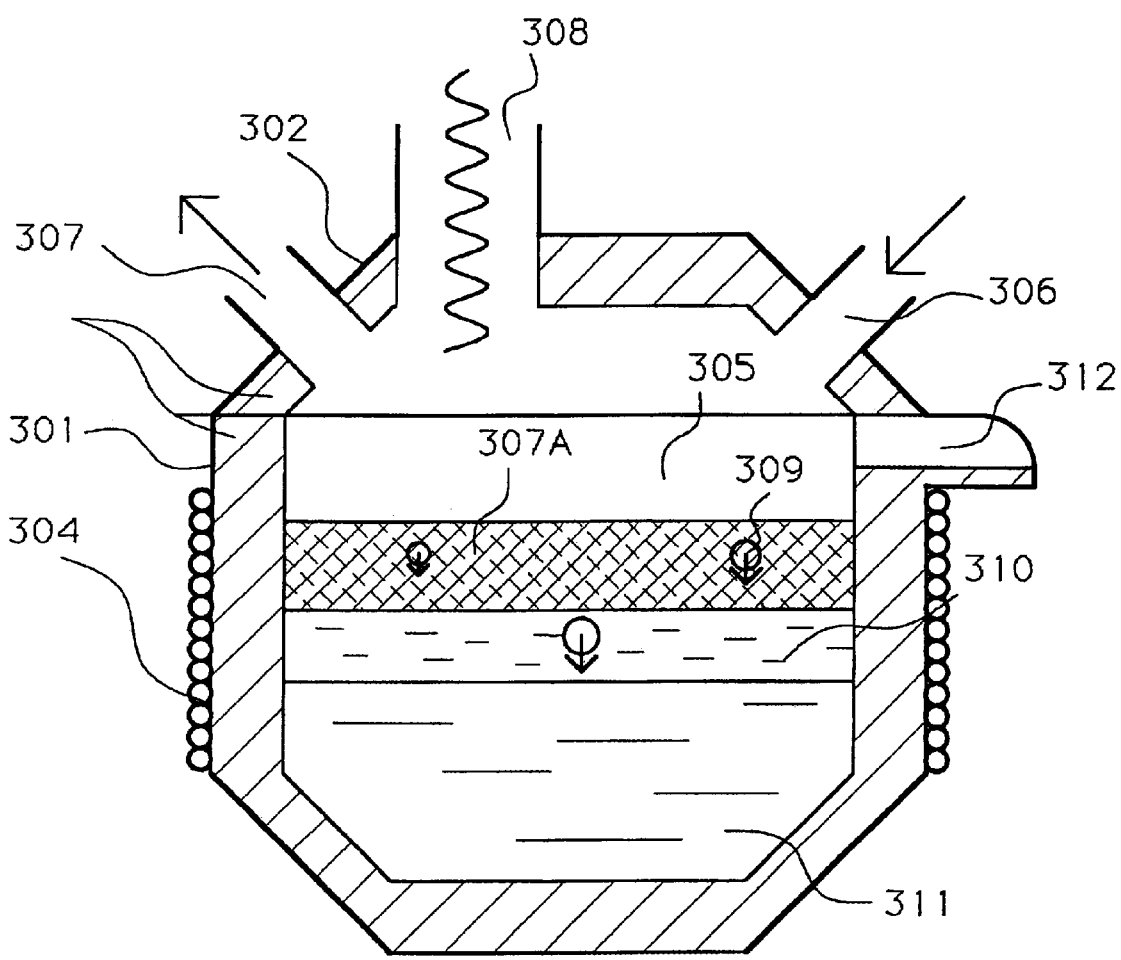
FIG. 3 shows a further embodiment of a high powered microwave furnace, including apparatus for the introduction of metal containing materials and an induction coil.

As another alternative method, a furnace with both microwave heating and induction heating capabilities can be constructed as shown in FIG. 3. The furnace comprises a water cooled metal vessel 301 and a removable water cooled metal cover 302, both lined with a refractory material 303. The refractory material may be selected from materials having poor microwave absorption characteristics, such as quartz. A portion of the metal vessel 301 is a coil made of copper tubing which serves as an induction coil 304. The apparatus is arranged to allow the flow of coolant, e.g. cold water, inside the tubing to cool the coil. The gaps between the turns of the coil are small to prevent microwave leakage. The metal vessel 301, the cover 302, and the induction coil 304 form the microwave cavity 305. An inlet 306 and an outlet 307 may be included in the cover 302 to allow introduction of process gases and the release of exhaust gases. Thus, the atmosphere within the furnace may be controlled.

To produce a metal, the cover 302 is moved away and a mixture 307A of metal-containing material, reducing agent, and other process-enhancing chemicals as appropriate to the particular circumstances, is charged into the cavity 305. The cover 302 is then moved back to close the vessel. Microwave energy is introduced through the waveguide 308 and the mixture 307A of raw materials starts to absorb the microwaves, with a resulting increase in temperature. The ore reacts with the reducing agent in the mixture, or with the reducing gas introduced via the inlet 306, to release a metal.

Once metal begins to appear, the induction heating power is turned on. Current flows through the induction coil 304 and the metal is further heated by the action of induced current. This additional heat input further raises the temperature of the mixture within the vessel. As the temperature rises, droplets of molten metal 309 accumulate and a molten slag 310 forms. Due to the difference in specific density between the molten metal and slag, the molten metal droplets descend to the bottom by gravity and form a molten pool 311 and the slag 310 floats to the top of the molten metal. The fluxing agent, which melts along with the rest of the mixture, lowers the viscosity of the slag and thus allows better separation of the molten metal and molten slag. The slag continues to absorb microwave energy and the molten metal continues to be heated by the induction current. After a short period of time for molten metal and slag to separate, the microwave and the induction heating powers are turned off. The vessel is tilted to pour the molten slag through a discharging port 312 into a slag container. The vessel is then tilted further to pour the molten metal into molds to form ingots, or into a caster to produce continuous casting. The molten metal also can be poured into a ladle and transferred into another smelter for refining.

It is also possible to use the instant furnace for refining. After the slag is poured into a slag container, the vessel is restored to the upright position, and the cover 302 is replaced. The induction heating power is turned on again. CaO and $NaCO_3$ may be added into the molten metal to react with sulphur and phosphorus. The product of these reactions is a slag which separates from the metal and can be removed. Scrap metals and alloys can be added into the molten metal to adjust the composition to meet particular specifications. During this portion of the process, induction heating is used to control the temperature.

Figure 4:
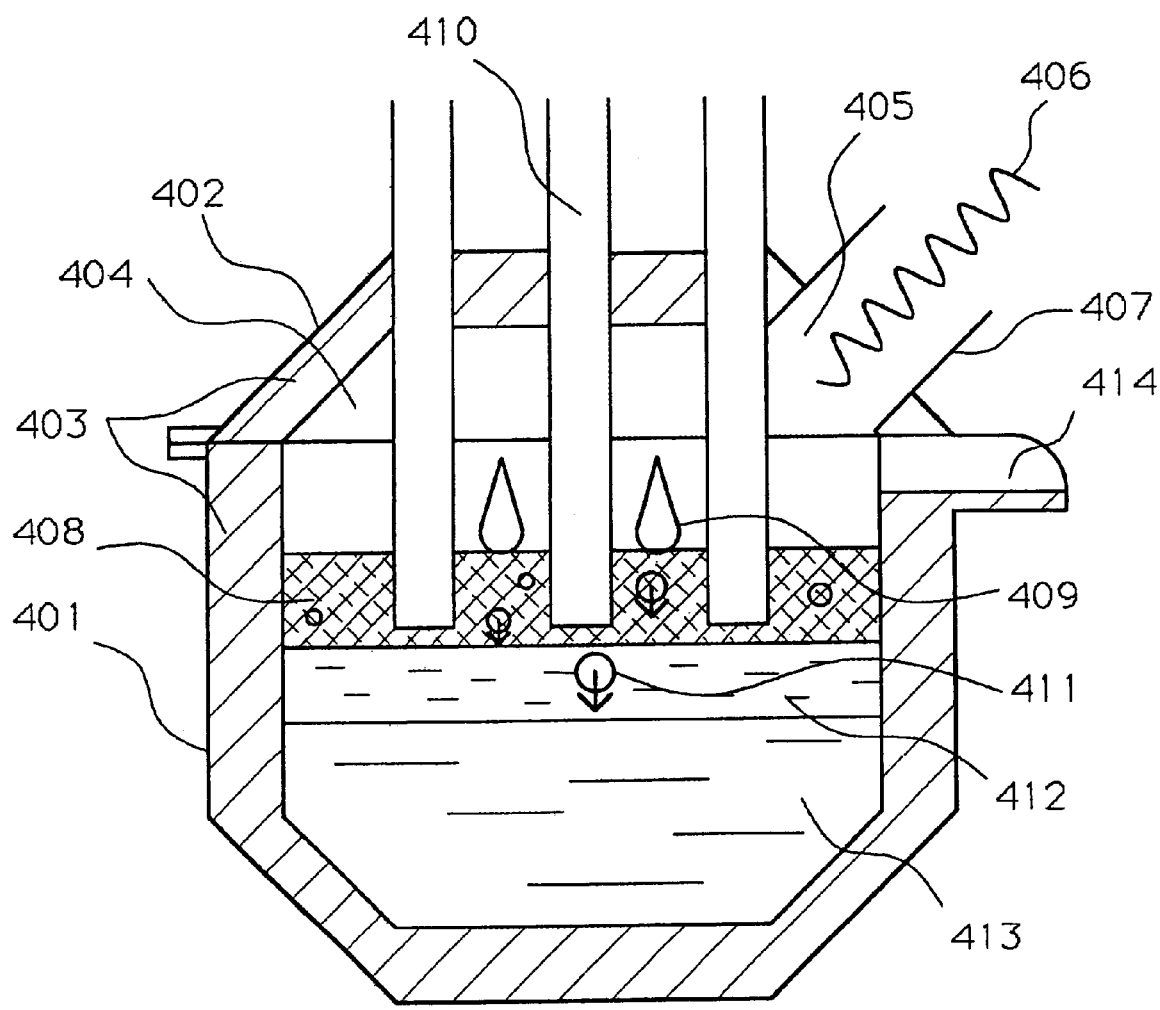
FIG. 4 shows another embodiment of a high powered microwave furnace, including apparatus for the introduction of metal containing materials and electric arc heating.

As yet another alternative method, a furnace with both microwave heating and electric arc heating capabilities can be constructed as shown in FIG. 4. The furnace comprises a water cooled metal vessel 401 and a removable water cooled metal cover 402, both lined with a refractory material 403. Three graphite electrodes 410 of greater than 50 mm in diameter are introduced through the metal cover 402 into the furnace chamber 404. A port 405 is opened on the cover 402 to introduce microwaves 406 from a microwave source (not shown) into the chamber 404 through a connecting waveguide 407. To produce a metal, the cover 402 is moved away and a mixture 408 of metal-containing material, reducing agent, and other process-enhancing chemicals as appropriate to the particular circumstances, is charged into the cavity 404. The cover 402 is then moved back to close the vessel. Microwave energy is introduced through the waveguide 407 and the mixture 408 of raw materials starts to absorb the microwaves, with a resulting increase in temperature. When the temperature is high enough, any auxiliary fuel introduced with the mixed raw material ignites to generate more heat 409 and further increase the temperature within the vessel. At an elevated temperature, the ore starts to react with the reducing agent in the mixture to become a directly reduced metal. Once metal begins to appear and the mass of raw material becomes electrically conductive, the electrodes 410 descend, and an electrical potential is applied between them to form electric arcs between the electrode tips and the metal. The metal is further heated by the action of the arcing. This additional heat input further raises the temperature of the mixture within the vessel. As the temperature rises, droplets of molten metal 411 accumulate and a molten slag 412 forms. Due to the difference in specific density between the molten metal and slag, the molten metal droplets descend to the bottom by gravity and form a molten pool 413 and the slag 412 floats to the top of the molten metal. The fluxing agent, which melts along with the rest of the mixture, lowers the viscosity of the slag and thus allows better separation of the molten metal and molten slag. After a short period of time for molten metal and slag to separate, power to the microwave and electric arc sources is turned off. The vessel is tilted to pour the molten slag through a discharging port 414 into a slag container. The vessel is then tilted further to pour the molten metal into molds to form ingots, or into a caster to produce continuous casting. The molten metal also can be poured into a ladle and transferred into another smelter for refining.

Figure 5:
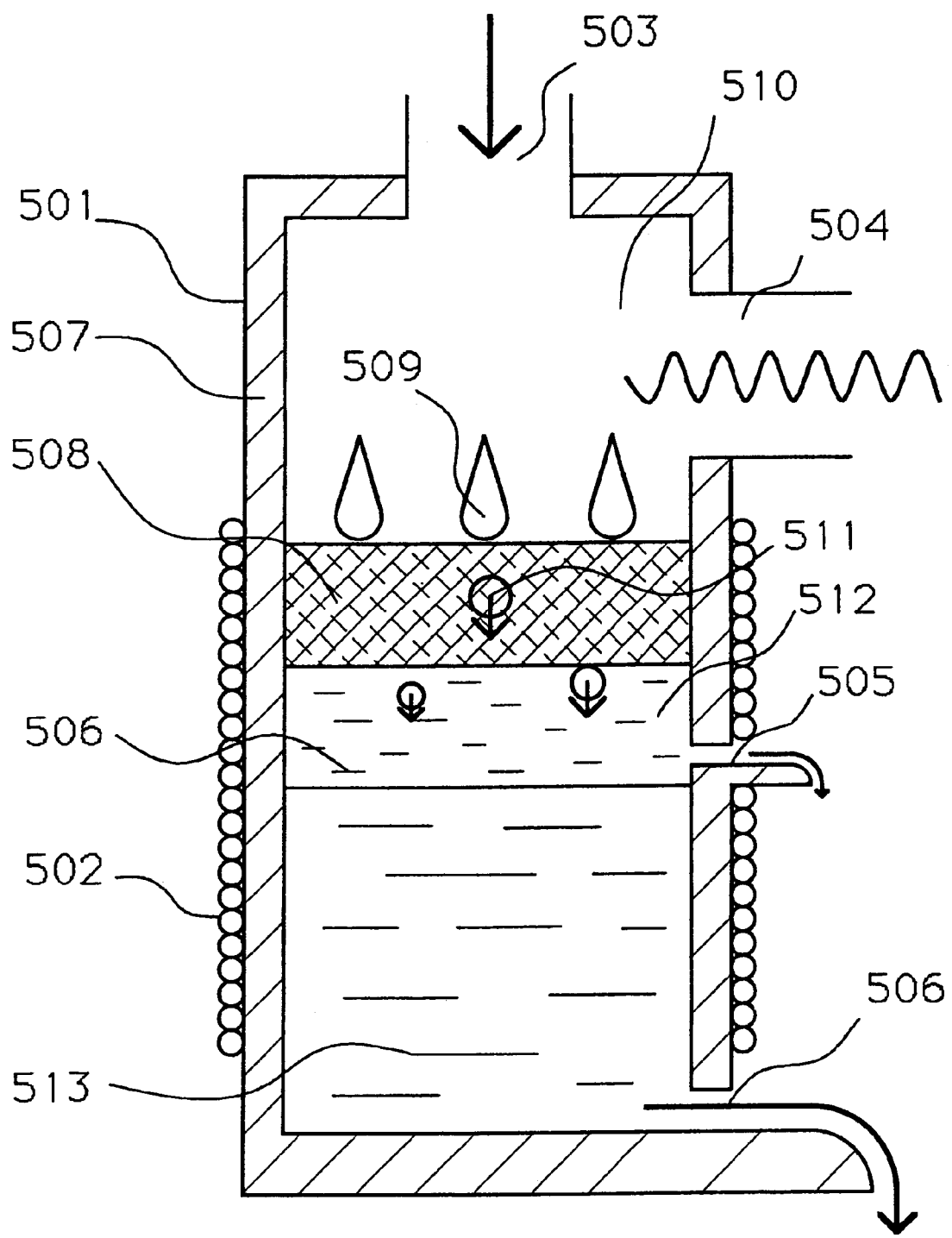
FIG. 5 shows a furnace for continuous production, including a raw materials charging port, a separate molten metal discharge port, and a slag discharge port.

As an alternative method aiming at continuous production, a continuous microwave/induction heating furnace can be constructed as shown in FIG. 5. It mainly comprises a water cooled metal shell 501, a water cooled induction heating coil 502, a raw materials charging port 503, a waveguide port 504, a slag discharge port 505 and a molten metal discharge port 506. The metal shell 501 and the induction coil 502 are lined with a refractory material 507 that absorbs microwaves poorly. To start the process, the mixed raw material 508 is charged through the charging port 503 into the furnace. The microwave power is turned on and the mixed raw material starts to absorb microwave energy and increase in temperature. As the temperature rises, the internal combustion auxiliary fuel ignites to generate heat 509 and further increase temperature. The ore reacts directly or indirectly with the reducing agent in the raw material to become a metal. The ore starts to melt and form molten metal droplets 510 and a molten slag 511. Due to specific density differences, the molten metal droplets descend to the bottom by gravity and form a molten pool 512, and the slag 511 floats on the top of the molten metal. The fluxing agent also melts and reacts with the slag to form a lower viscosity slag for better separation of the molten metal and the molten slag. After the molten metal forms and sinks to the bottom, the induction heating power is turned on to heat and maintain the temperature of the molten metal. The slag continues to absorb microwave energy. After accumulating enough molten slag or molten metal, the slag and metal are separately discharged through discharge holes 505 and 506 respectively. Holes 505 and 506 are blocked with fireclay. At the appropriate time, they are broken using a steel rod. The molten metal can be cast into ingots or a continuous casting, or transferred into a refining furnace to remove impurities, adjust composition, and control temperature to produce high quality alloys. As the molten slag and metal are discharged, more raw material is charged into the furnace through the charging port 503. The heating, ore reduction, melting, discharging and recharging continue to cycle.

EXAMPLES

Example 1

A sample was prepared comprising an iron ore concentrate containing 65% Fe mixed with 15% carbon black as the reducing agent, 1% lime as the fluxing agent, and 5% pulverized coal as an auxiliary fuel. The mixture was charged into a fireclay crucible and inserted into a microwave processing system MCR 200, which was manufactured by Wavemat, Inc. This unit includes a 2.45 GHz microwave generator with 300 to 3,000 watts of power. This microwave system can be operated with a tunable, single mode or controlled multi-mode microwave cavity. The cavity can be evacuated or continuously purged with an inert gas or a reducing gas. The sample was heated to 1200° C. in ten minutes using a single mode with 1 kw power. The temperature was measured using a pyrometer on the outer surface of the crucible. The crucible inside temperature was not measured but it is believed to have been higher than 1200° C. The pulverized coal burned and flame appeared during the heating. The sample temperature was maintained at about 1200° C. for two minutes and then the power was shout off. The examination of this sample after it cooled to room temperature showed that metal and slag formed. The metal accumulated at the bottom and the slag at the top of the crucible. Chemical composition analyses showed that the metal contained 1.53% Si, 97.72% Fe, 0.42% Al, 0.13% S, and 0.2% C and the slag contained 53.58% $SiO_2$, 15.48% FeO, 0.48% CaO, 1.56% MgO, 15.40% $Al_2O_3$, 0.53% $K_2O$, 0.39% MnO, and 12.59% $TiO_2$.

Example 2

A sample was prepared comprising $Cu_2S$ powder mixed with a stoichiometric amount of carbon black, i.e. 7.5% as a reducing agent. The mixture was charged into a fireclay crucible covered with a fireclay disk and placed into the microwave processing system MCR 200. The microwave cavity was continuously purged with $N_2$ and the exhaust port of the cavity was connected to a scrubber. The scrubber consisted of a glass flask with a side tube and a rubber stopper to seal its mouth. The flask was half filled with an alkaline 10% NaOH solution. A tube passed through the rubber stopper and one end of the tube was submerged in the alkaline solution. The other end of the tube was connected to the exhaust port of the microwave cavity with a hose. During heating, a lot of smoke came out of the sample and was introduced into the NaOH solution. The sample was heated to 1100° C. in 5 minutes using a single mode. The temperature was measured using a pyrometer on the outer surface of the crucible. The temperature was maintained at about 1100° C. for two minutes and the power was then turned off. It was found that copper accumulated on the bottom and a slag formed on the top of the crucible. An analysis indicated that the scrubber solution contained sulphur.

What is claimed is:

1. A method for the direct preparation of metal from metal containing ore comprising providing metal containing ore and a reducing agent, concentrating said ore into fine particles, mixing said fine particles with said reducing agent to form a mixture, agglomerating said mixture into a plurality of masses, charging said masses into a container, heating said mixture with minimal contamination by applying microwave energy to said mixture until molten metal is released from said metal containing ore, accumulating said molten metal by gravity at the bottom of said container, and discharging said metal from said container.

2. A method as defined in claim 1 further comprising the step of mixing a fluxing agent with said ore.

3. A method as defined in claim 1 further comprising the step of mixing an auxiliary fuel with said ore.

4. A method as defined in claim 1 further comprising the step of mixing a microwave absorber material with said ore.

5. A method as defined in claim 1 further comprising the step of preheating said ore to increase its microwave absorption.

6. A method as defined in claim 1 further comprising the step of heating said ore by electrical induction.

7. A method as defined in claim 1 further comprising the step of heating said ore by electric arc heating.

8. A method as defined in claim 1 further comprising the step of controlling the surrounding atmosphere of said ore during said heating.

9. A method as defined in claim 1 wherein said container comprises a vacuum system.

10. A method as defined in claim 1 further comprising the step of collecting sulphur vapor or $SO_2$ released from said ore during said heating.

11. A method as defined in claim 1 wherein said container comprises a ceramic crucible.

12. A method as defined in claim 1 wherein said container comprises a tiltable metal vessel lined with refractory material.

13. A method as defined in claim 1 wherein said container comprises an induction coil.

14. A method as defined in claim 1 wherein said container comprises electrodes.

15. A method as defined in claim 1 wherein said container comprises a static metal furnace with a molten metal discharge hole.

16. A method as defined in claim 1 wherein said ore comprises a metal selected from the group consisting of iron, copper, nickel, cobalt, lead, and zinc.

17. A method as defined in claim 1 further comprising heating said ore at least until a molten slag is formed.

* * * * *